US012615449B2

(12) United States Patent
Moon et al.

(10) Patent No.: US 12,615,449 B2
(45) Date of Patent: Apr. 28, 2026

(54) ROW DRIVERS, IMAGE SENSORS, AND IMAGE PROCESSING SYSTEMS INCLUDING THE SAME

(71) Applicant: Samsung Electronics Co., Ltd., Suwon-si (KR)

(72) Inventors: Joosung Moon, Suwon-si (KR); Hyukbin Kwon, Suwon-si (KR); Sungjae Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/828,137

(22) Filed: Sep. 9, 2024

(65) Prior Publication Data

US 2025/0097595 A1      Mar. 20, 2025

(30) Foreign Application Priority Data

Sep. 20, 2023   (KR) ........................ 10-2023-0125846
Sep. 3, 2024   (KR) ........................ 10-2024-0119564

(51) Int. Cl.
*H04N 25/532*       (2023.01)
*H04N 25/766*       (2023.01)

(52) U.S. Cl.
CPC ......... *H04N 25/532* (2023.01); *H04N 25/766* (2023.01)

(58) Field of Classification Search
CPC ............... H04N 25/532; H04N 25/766; H04N 25/7795; H04N 25/709; H04N 25/771; H04N 25/779

USPC .................................................... 348/294–324
See application file for complete search history.

(56) References Cited

U.S. PATENT DOCUMENTS

| | | |
|---|---|---|
| 8,045,028 B1 | 10/2011 | De |
| 10,701,294 B1 * | 6/2020 | Cremers ............ H04N 25/7795 |
| 11,019,286 B2 | 5/2021 | Shim et al. |
| 2008/0083980 A1 | 4/2008 | Yang et al. |
| 2012/0069213 A1 | 3/2012 | Jannard et al. |
| 2013/0048831 A1 | 2/2013 | Bikumandla |
| 2015/0189197 A1 | 7/2015 | Guo et al. |
| 2016/0142653 A1 | 5/2016 | Cho et al. |
| 2020/0145597 A1 | 5/2020 | Prathipati |
| 2020/0195863 A1 * | 6/2020 | Shim .................... H04N 25/616 |
| 2021/0044297 A1 * | 2/2021 | Han .................. H03K 3/35613 |
| 2022/0101781 A1 * | 3/2022 | Baumheinrich ......... G09G 3/32 |

* cited by examiner

*Primary Examiner* — Yogesh K Aggarwal
(74) *Attorney, Agent, or Firm* — Wolf, Greenfield & Sacks, P.C.

(57) ABSTRACT

An image sensor and an image processing system. The image sensor includes a pixel array comprising a plurality of pixels, a row driver configured to generate control signals for controlling the plurality of pixels, the row driver configured to use an external voltage received from a source outside the image sensor and an internal voltage generated within the image sensor, and a voltage generator configured to generate the internal voltage, wherein the external voltage includes a first external voltage and a second external voltage, the internal voltage includes a first internal voltage and a second internal voltage, a level of the first internal voltage is higher than a level of the second internal voltage, and a level of the first external voltage is between the level of the first internal voltage and the level of the second internal voltage.

20 Claims, 13 Drawing Sheets

140A

1

ROW DRIVERS, IMAGE SENSORS, AND IMAGE PROCESSING SYSTEMS INCLUDING THE SAME

CROSS-REFERENCE TO RELATED APPLICATIONS

This application is based on and claims priority under 35 U.S.C. § 119 to Korean Patent Application No. 10-2023-0125846, filed on Sep. 20, 2023 and Korean Patent Application No. 10-2024-0119564 filed on Sep. 3, 2024, in the Korean Intellectual Property Office, and the entire contents of the above-identified applications are incorporated by reference herein.

TECHNICAL FIELD

The present disclosure relates to image sensors, and more particularly, to row drivers configured to support a global shutter operation, image sensors, and image processing systems including the same.

BACKGROUND

As mobile devices become smaller, various functions are being integrated into them. The functions and the performance of an image sensor included in a mobile device have a significant impact on the characteristics of the mobile device. Technologies for reducing the power consumption and for reducing the size of image sensors are becoming increasingly important.

An image sensor may determine an amount of photo charges, which are the basis for an electrical signal, by adjusting an exposure time. An image sensor may control the exposure time using a rolling shutter method and a global shutter method. The global shutter method is a method of controlling the integration time of photo charges equally for different rows of a pixel array.

An image sensor may include a row driver that controls a pixel array using the global shutter method. When performing the global shutter method, a voltage drop may occur, because pixels may be driven simultaneously.

SUMMARY

The present disclosure provides row drivers configured to sequentially control the driving voltage of a row driver by using an external voltage generated outside an image sensor, the image sensor, and an image processing system including the same.

According to some aspects of the present disclosure, there is provided an image sensor including a pixel array in which a plurality of pixels are arranged, a row driver configured to generate control signals for controlling the plurality of pixels the row driver configured to use an external voltage received from a source outside the image sensor and an internal voltage generated within the image sensor, and a voltage generator configured to generate the internal voltage, wherein the external voltage includes a first external voltage and a second external voltage, the internal voltage includes a first internal voltage and a second internal voltage, a level of the first internal voltage is higher than a level of the second internal voltage, and a level of the first external voltage is between the level of the first internal voltage and the level of the second internal voltage. The row driver may include a pull-up transistor configured to receive the first internal voltage, a first transistor connected to one end of the pull-up transistor and connected to a first node, a second transistor connected to the first node, a pull-down transistor configured to receive the second internal voltage and connected to one end of the second transistor, a third transistor connected to the first node, and a fourth transistor configured to receive the first external voltage and connected to one end of the third transistor.

According to some aspects of the present disclosure, there is provided an image processing system including a first chip including an external voltage generator configured to generate an external voltage and a first pad configured to output the external voltage, a second pad configured to receive the external voltage, a pixel array in which a plurality of pixels are arranged, a second chip comprising a voltage generator configured to generate an internal voltage, and a row driver configured to generate control signals for controlling the plurality of pixels by using the external voltage and the internal voltage. The external voltage may include a first external voltage and a second external voltage, the internal voltage includes a first internal voltage and a second internal voltage, a level of the first internal voltage is higher than a level of the second internal voltage, and a level of the first external voltage is between the level of the first internal voltage and the level of the second internal voltage. The row driver may include a pull-up transistor configured to receive the first internal voltage, a first transistor connected to one end of the pull-up transistor and connected to a first node, a third transistor connected to the first node, and a pull-down transistor configured to receive the second internal voltage and connected to one end of the second transistor, a third transistor connected to the first node, and a fourth transistor configured to receive the first external voltage and connected to one end of the third transistor.

According to some aspects of the inventive concepts, there is provided a row driver including a first transistor that is configured to receive a first internal voltage and is connected to a first node, a second transistor that is connected to the first node and is configured to receive a second internal voltage, and a third transistor that is connected to the first node and is configured to receive an external voltage generated by a source that is different from a source of the first internal voltage and the second internal voltage, where a level of the first internal voltage is higher than a level of the second internal voltage, and a level of the external voltage is between the level of the first internal voltage and the level of the second internal voltage.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
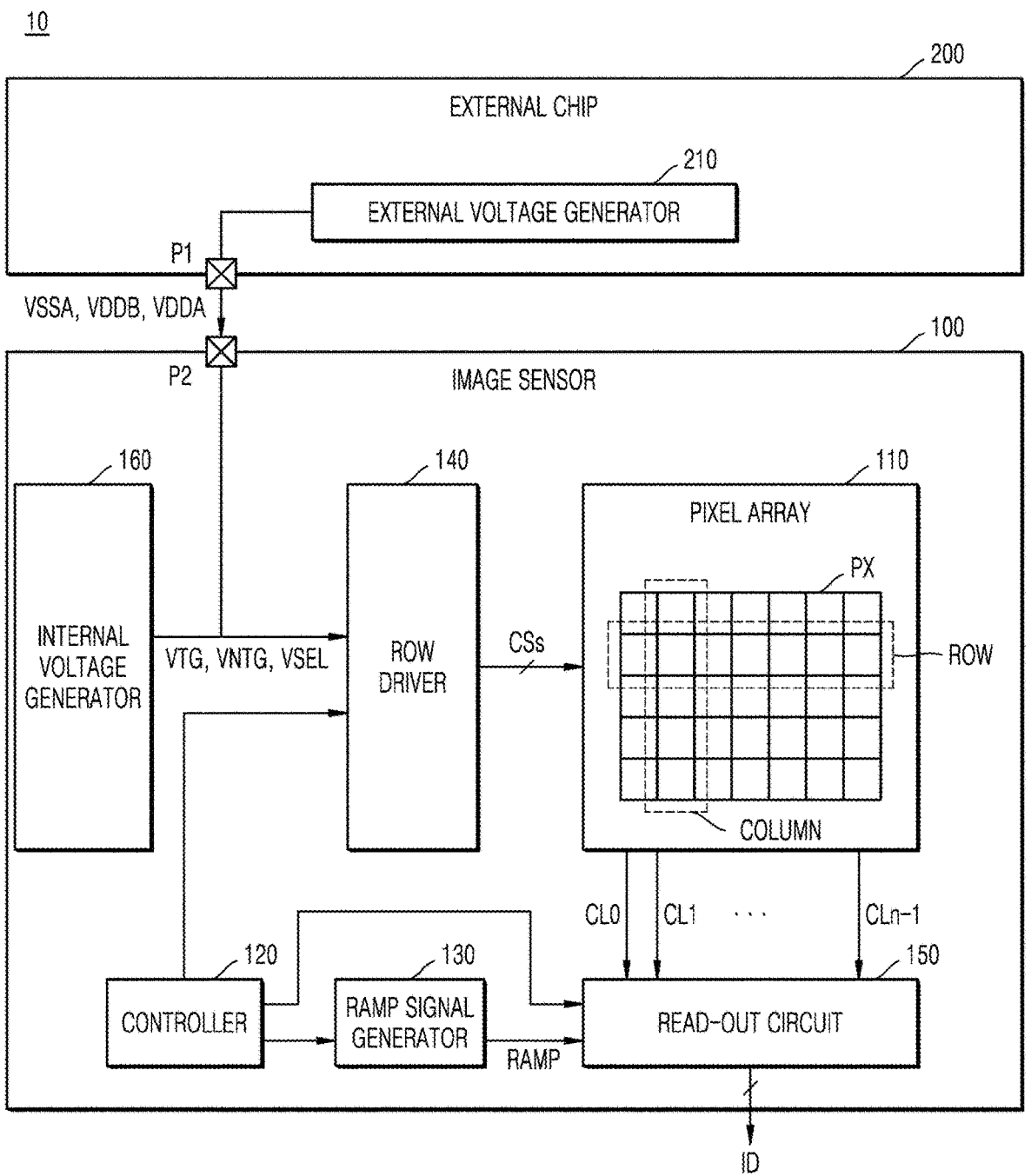
FIG. 1 is a block diagram showing an image processing system according to some embodiments.

FIG. 1 is a block diagram showing an image processing system 10 according to some embodiments.

Referring to FIG. 1, the image processing system 10 may include an external chip 200 and an image sensor 100. The external chip 200 may include an external voltage generator 210, and the image sensor 100 may include a pixel array 110, a controller 120, a ramp signal generator 130, a row driver 140, a read-out circuit 150, and an internal voltage generator 160.

The external chip 200 may be a power management integrated circuit (PMIC). The image sensor 100 and the external chip 200 may each be implemented as chips, e.g., as respective chips. For example, the external chip 200 may supply power and a supply voltage to the image sensor 100.

The external voltage generator 210 may generate one or more external voltages to be provided to the image sensor 100. The external voltages generated by the external voltage generator 210 may include a first external voltage VSSA, a second external voltage VDDB, and a third external voltage VDDA. For example, the level of the first external voltage VSSA may be 0 V, the level of the second external voltage VDDB may be 1.8 V, and the level of the third external voltage VDDA may be 2.2 V. However, the present disclosure is not limited thereto. The external voltage generator 210 may function as a power source and may supply an external voltage to the row driver 140. However, the present disclosure is not limited thereto.

The external chip 200 may further include a first pad P1 connected to a voltage transmission line configured to supply an external voltage. The image sensor 100 may further include a second pad P2, and the second pad P2 may be provided with the external voltages generated by the external voltage generator 210, e.g., first, second, and third external voltages VSSA, VDDB, and VDDA generated by the external voltage generator 210.

The pixel array 110 may include a plurality of pixels PX. The plurality of pixels PX may each include a photoelectric conversion element, and the plurality of pixels PX may generate pixel signals corresponding to an object by converting light detected by the photoelectric conversion elements. The plurality of pixels PX may output pixel signals to the read-out circuit 150 through first to n-th column lines CLO to CLn-1 corresponding thereto.

In the pixel array 110, the plurality of pixels PX may be arranged in a matrix-like shape including a plurality of rows and a plurality of columns. The plurality of pixels PX may be active pixel sensors (APS).

According to some embodiments, the plurality of pixels PX may each include one of a red filter that transmits light in the red wavelength range therethrough, a green filter that transmits light in the green wavelength range therethrough, and a blue filter that transmits light in the blue wavelength range therethrough. However, the present disclosure is not limited thereto, and the plurality of pixels PX may each include a color filter or a transparent filter that transmits light in a different color wavelength range. According to some embodiments, the plurality of pixels PX may each include one of a white color filter, a cyan color filter, a magenta color filter, and/or a yellow color filter.

The controller 120 may control the operation of the row driver 140, the operation of the ramp signal generator 130, and the operation of the read-out circuit 150. The controller 120 may include a control register block, and the control register block may control the operation of the row driver 140, the ramp signal generator 130, and the read-out circuit 150 according to the control of the external chip 200. According to some embodiments, the controller 120 may control the row driver 140, the ramp signal generator 130, and the read-out circuit 150 such that the image sensor 100 operates in a global shutter mode.

The internal voltage generator 160 may generate an internal voltage to be provided to the row driver 140. The internal voltage may include a first internal voltage VTG, a second internal voltage VNTG, and a third internal voltage VSEL. For example, the level of the first internal voltage VTG may be 1.83 V, the level of the second internal voltage VNTG may be −2.01 V, and the level of the third internal voltage VSEL may be 3 V. However, the present disclosure is not limited thereto. The internal voltage generator 160 may function as a power source and may supply an internal voltage to the row driver 140. However, the present disclosure is not limited thereto.

For example, the level of the first internal voltage VTG may be higher than the level of the second internal voltage VNTG. The level of the first external voltage VSSA may be lower than the level of the second external voltage VDDB. The level of the first external voltage VSSA may be lower than the level of the first internal voltage VTG and may be higher than the level of the second internal voltage VNTG. The level of the second external voltage VDDB may be higher than the level of the first external voltage VSSA and may be lower than the level of the first internal voltage VTG.

The row driver 140 may generate control signals CSs that may control the pixel array 110 by using an external voltage and an internal voltage and provide the control signals CSs to the plurality of pixels PX, respectively. According to some embodiments, the row driver 140 may determine timings for activating and deactivating the control signals CSs for each of the plurality of pixels PX to operate in the global shutter mode.

The control signals CSs may be generated in correspondence to rows of the pixel array 110 such that the pixel array 110 is controlled row-by-row. The pixel array 110 may output pixel signals including a reset signal and an image signal from one or more selected rows to the read-out circuit 150, in response to the control signals CSs provided from the row driver 140.

The ramp signal generator 130 may generate a ramp signal RAMP. The ramp signal RAMP is a signal used in converting an analog signal into a digital signal and may be generated as a triangle wave. The ramp signal generator 130 may provide the ramp signal RAMP to the read-out circuit 150, e.g., a correlated double sampling circuit.

The read-out circuit 150 may sample and hold a pixel signal provided from the pixel array 110. For example, the read-out circuit 150 may receive the ramp signal RAMP generated by the ramp signal generator 130 and generate image data ID by analog-to-digital converting results of comparing a reset signal, a first reference signal, a second reference signal, and an image signal with the ramp signal RAMP. For example, the read-out circuit 150 may include a correlated double sampling (CDS) circuit, an analog-digital converter, a buffer, etc.

The image data ID generated by the read-out circuit 150 may be provided to a digital signal processor (DSP) other than the image sensor 100. The DSP may perform signal processing based on the image data ID. For example, the DSP may perform noise reducing processing, gain adjustment, waveform formulation, interpolation processing, white balance processing, gamma processing, edge emphasis processing, etc.

When the image sensor 100 operates according to the global shutter method, the row driver 140 may be driven by using an internal voltage to simultaneously drive the plurality of pixels of the pixel array 110. When the row driver 140 uses only an internal voltage, not only the driving load of the internal voltage increases but also the voltage settling time increases.

However, according to some embodiments, when the image sensor 100 operates according to the global shutter method, the row driver 140 uses not only an internal voltage generated by the internal voltage generator 160 inside the image sensor 100 but also an external voltage (e.g., an external voltage generated by the external voltage generator 210). Therefore, even when a plurality of pixels are simultaneously driven, voltages may be sequentially driven in a multi-state, and thus the voltage settling time may be reduced.

Figure 2:
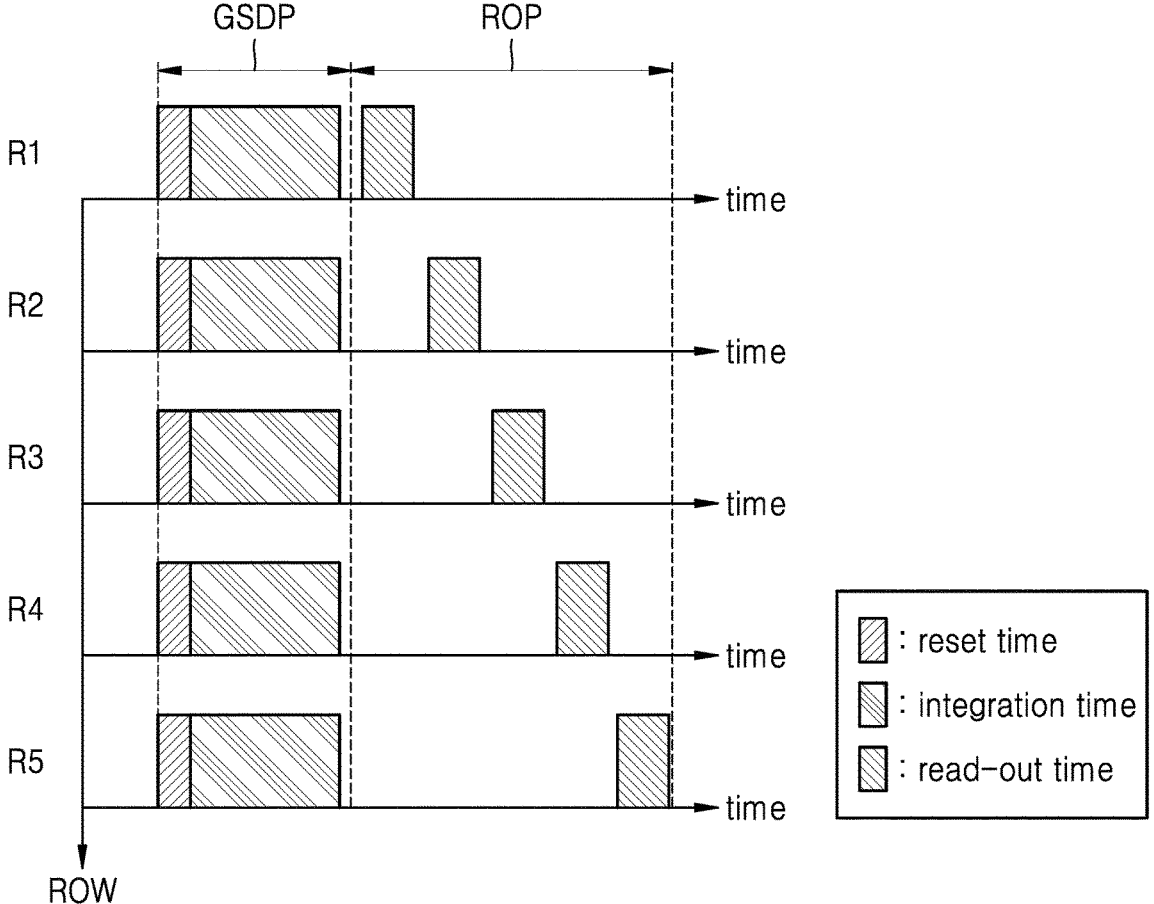
FIG. 2 is a diagram for describing the operation of an image sensor in a global shutter mode, according to some embodiments.

FIG. 2 is a diagram for describing the operation of the image sensor 100 in a global shutter mode, according to some embodiments.

Referring to FIGS. 1 and 2, the image sensor 100 may operate in the global shutter mode. In the global shutter mode, the image sensor 100 may perform a global signal dumping operation performed during a global signal dumping period GSDP and may perform a read-out operation performed during a read-out period ROP. The global signal dumping operation may include a reset operation of resetting charges accumulated in a floating diffusion node and an accumulation operation of accumulating photo charges generated by photoelectric conversion elements.

In the global signal dumping period GSDP, the image sensor 100 may control a reset time during which a reset operation is performed on different rows (e.g., first to fifth rows R1 to R5) to be identical to an integration time during which the accumulation operation is performed on the different rows. The integration time may refer to the time for substantially accumulating photo charges generated by photoelectric conversion elements (e.g., photodiodes) included in the plurality of pixels PX. The same charge integration time may mean that charges are accumulated at the same time point.

Although FIG. 2 shows that the number of rows in which charges are simultaneously accumulated is five, it is only for convenience of explanation, and the image sensor 100 according to the present disclosure is not limited thereto. According to some embodiments, the image sensor 100 may control the charge integration time to be the same for all of the plurality of pixels PX of the pixel array 110.

In the read-out period ROP, a rolling read-out operation in which read-out operations are sequentially performed row-by-row may be performed. The image sensor 100 may be controlled to sequentially perform a read-out operation for row-by-row during the read-out time. For example, the first to fifth rows R1 to R5 may be controlled to sequentially perform a read-out operation from a first row R1 to a fifth row R5. The read-out time may refer to the time in which pixel signals corresponding to photo charges generated by the plurality of pixels PX are output from the plurality of pixels PX, respectively.

By operating in a global shutter mode, the image sensor 100 according to the present disclosure may control time points of photo charge accumulation of the pixels PX arranged in different rows to be identical to one another.

Figure 3:
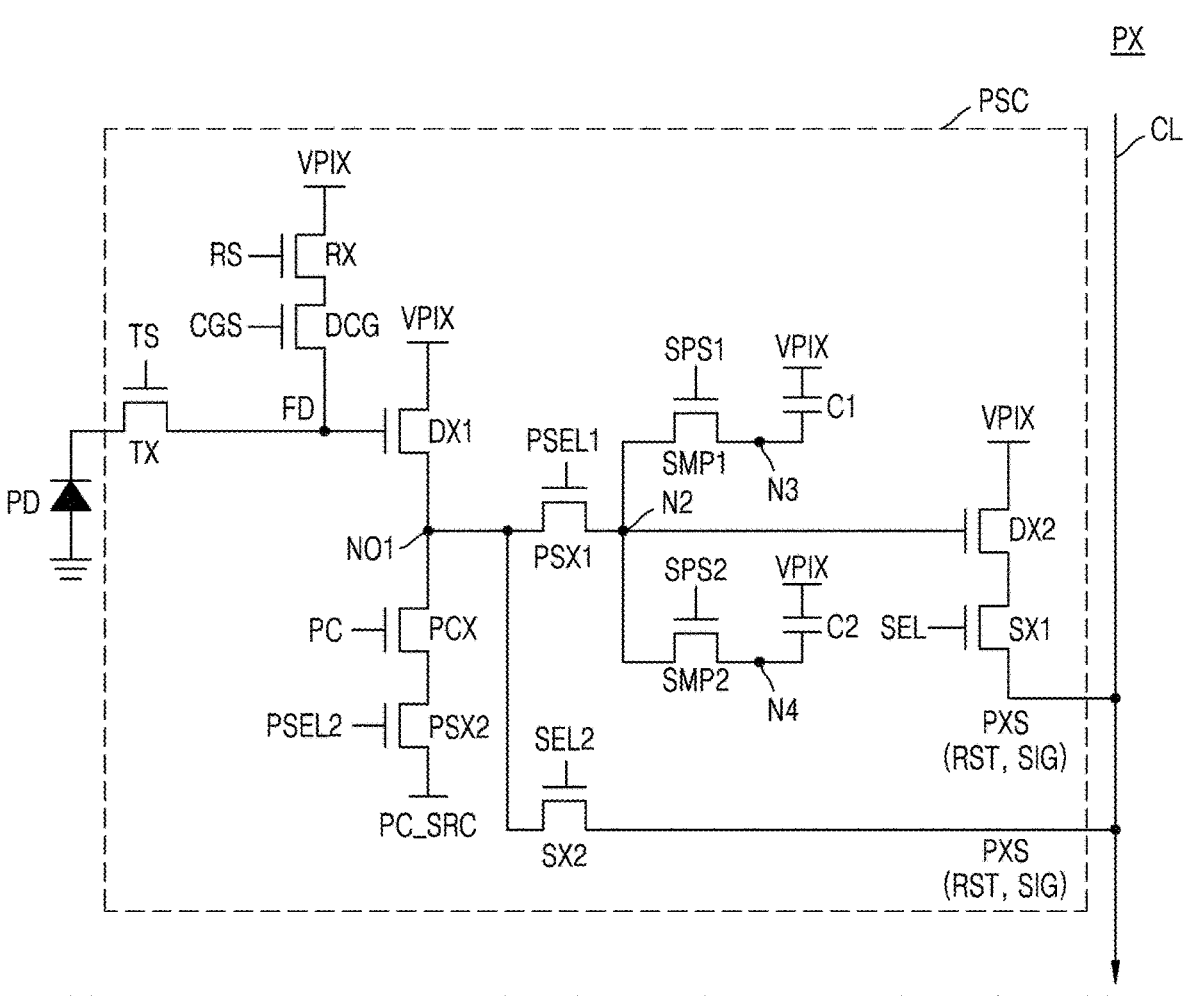
FIG. 3 is a circuit diagram of a pixel included in an image sensor, according to some embodiments.

FIG. 3 is a circuit diagram of a pixel PX included in an image sensor, according to some embodiments.

Referring to FIG. 3, the pixel PX may include a photodiode PD and a pixel signal generation circuit (or referred to as a pixel circuit). The pixel signal generation circuit may include a plurality of transistors TX, RX, DCG, DX1, PSX1, PSX2, PCX, SMP1, SMP2, DX2, SX1, and SX2, a first capacitor C1, and a second capacitor C2. Control signals TG, RS, CGS, PSEL1, PSEL2, PC, SPS1, SPS2, SEL1, and SEL2 may be applied to the pixel signal generation circuit, and at least some of the control signals may be generated by the row driver 140 of FIG. 1.

In other words, the row driver 140 of FIG. 1 may generate the control signals TS, RS, CGS, PSEL1, PSEL2, PC, SPS1, SPS2, SEL1, and SEL2 by using an operating voltage supplied from the external voltage generator 210 and/or the internal voltage generator 160. For example, the row driver 140 may include drivers capable of generating the control signals TS, RS, CGS, PSEL1, PSEL2, PC, SPS1, SPS2, SEL1, and SEL2 row-by-row.

The photodiode PD may generate photo charges that vary according to the intensity of light. For example, the photodiode PD may generate charges, that is, electrons (i.e., negative charges) and holes (i.e., positive charges), in proportion to the amount of incident light. The photodiode PD is an example of a photoelectric conversion element and may be at least one of a phototransistor, a photogate, a pinned photodiode (PPD), and a combination thereof.

The transfer transistor TX may be connected between the photodiode PD and a floating diffusion node FD. A first terminal of the transfer transistor TX may be connected to an output terminal of the photodiode PD, and a second terminal of the transfer transistor TX may be connected to the floating diffusion node FD. The transfer transistor TX may be turned on or off in response to a transfer control signal TG received from the row driver (140 of FIG. 1) and may transfer photo charges generated by the photodiode PD to the floating diffusion node FD.

The reset transistor RX may reset charges accumulated in the floating diffusion node FD. A pixel voltage VPIX (e.g., power voltage) may be applied to a first terminal of the reset transistor RX, and a second terminal of the reset transistor RX may be connected to the floating diffusion node FD. The reset transistor RX may be turned on or off in response to a reset control signal RS received from the row driver (140 of FIG. 1), and, as charges accumulated in the floating diffusion node FD are discharged, the floating diffusion node FD may be reset.

A conversion gain control transistor DCG may adjust the conversion gain of a pixel PX. The conversion gain control transistor DCG may be turned on or off in response to a gain control signal CGS.

A pixel voltage VPIX may be applied to a first terminal of the first driving transistor DX1, and a second terminal of the first driving transistor DX1 may be connected to a first node N1. The first driving transistor DX1 is a buffer amplifier and may buffer a signal according to the amount of charges accumulated in the floating diffusion node FD.

The pixel signal generation circuit may operate the first driving transistor DX1 and include a plurality of transistors for pre-charging a second node N2, e.g., a pre-charge transistor PC, a first pre-charge selection transistor PSX1, and a second pre-charge selection transistor PSX2.

A first terminal of the pre-charge transistor PCX may be connected to the first node N1, and a second terminal of the pre-charge transistor PCX may be connected to a first terminal of the second pre-charge selection transistor PSX2. A second terminal of the second pre-charge selection transistor PSX2 may be connected to a pre-charge source PC_SRC. For example, the pre-charge source PC_SRC may be a ground voltage. The second pre-charge selection transistor PSX2 may be turned on or off in response to the second pre-charge selection control signal PSEL2. The second pre-charge selection transistor PSX2 may be turned on and provide the pre-charge source PC_SRC to the second terminal of the pre-charge transistor PCX. The pre-charge transistor PCX may operate as a current source and generate a load current according to the pre-charge control signal PC, and the first driving transistor DX1 may operate according to the load current.

The first terminal of the first pre-charge selection transistor PSX1 may be connected to the first node N1 and the second terminal of the first pre-charge selection transistor PSX1 may be connected to the second node N2. The second pre-charge selection transistor PSX1 may be turned on or turned off in response to the first pre-charge selection control signal PSEL1 and may be turned on and pre-charge the second node N2.

Although FIG. 3 shows that the pixel PX includes two pre-charge selection transistors PSX1 and PSX2, the inventive concept is not limited thereto. The pixel PX is a transistor for pre-charging the second node N2 based on the voltage of the first node N1 and may include a various number of pre-charge selection transistors.

A first sampling transistor SMP1, a second sampling transistor SMP2, the first capacitor C1, and the second capacitor C2 may operate as a sampling circuit for sampling a first voltage (e.g., a reset voltage) and a second voltage (e.g., an image voltage) output through the first node N1 when the pixel PX operates in the global shutter mode.

The first terminal of the first sampling transistor SMP1 may be connected to the second node N2, and the second terminal of the first sampling transistor SMP1 may be connected to a third node N3. A first terminal of the first capacitor C1 may be connected to the third node N3, and the pixel voltage VPIX may be applied to a second terminal of the first capacitor C1. According to some embodiments, a ground voltage may be applied to the second terminal of the first capacitor C1. The first sampling transistor SMP1 may be turned on or off in response to a first sampling control signal SPS1 and may be turned on to interconnect the first capacitor C1 and the second node N2. A first terminal of the second sampling transistor SMP2 may be connected to the second node N2, and a second terminal of the second sampling transistor SMP2 may be connected to a fourth node N4. A first terminal of the second capacitor may be connected to the fourth node N4, and the pixel voltage VPIX may be applied to a second terminal of the second capacitor C2. According to an embodiment, a ground voltage may be applied to the second terminal of the second capacitor C2. The second sampling transistor SMP2 may be turned on or off in response to a second sampling control signal SPS2 and may be turned on to interconnect the second capacitor C2 and the second node N2.

A reset voltage according to a reset operation may be sampled or an image voltage according to photo charges accumulated in the photodiode PD may be sampled by each of the first capacitor C1 and the second capacitor C2.

The pixel voltage VPIX may be applied to a first terminal of a second driving transistor DX2, and a second terminal of the second driving transistor DX2 may be connected to the first selection transistor SX1. The second driving transistor DX2 may amplify and output a potential change at the second node N2.

A first terminal of the first selection transistor SX1 may be connected to the second driving transistor DX2, and a second terminal of the first selection transistor SX1 may be connected to a column line CL. The first selection transistor SX1 may be turned on or off in response to a first selection control signal SEL1.

When the pixel array 110 operates in the global shutter mode, the first selection transistor SX1 may be turned on during the read-out period of the pixel PX and output an output of the second driving transistor DX2, e.g., a reset voltage RST or an image voltage SIG as the pixel signal PXS to the column line CL.

A first terminal of a second selection transistor SX2 may be connected to the first node N1, and a second terminal of the second selection transistor SX2 may be connected to the column line CL. The second selection transistor SX2 may be turned on or off in response to a second selection control signal SLD2.

When the pixel PX operates in a rolling shutter mode, the second selection transistor SX2 may be turned on during the read-out period of the pixel PX and output an output of the first driving transistor DX1, e.g., the reset voltage RST, or the image voltage SIG, as the pixel signal PXS to the column line CL.

Figure 4:
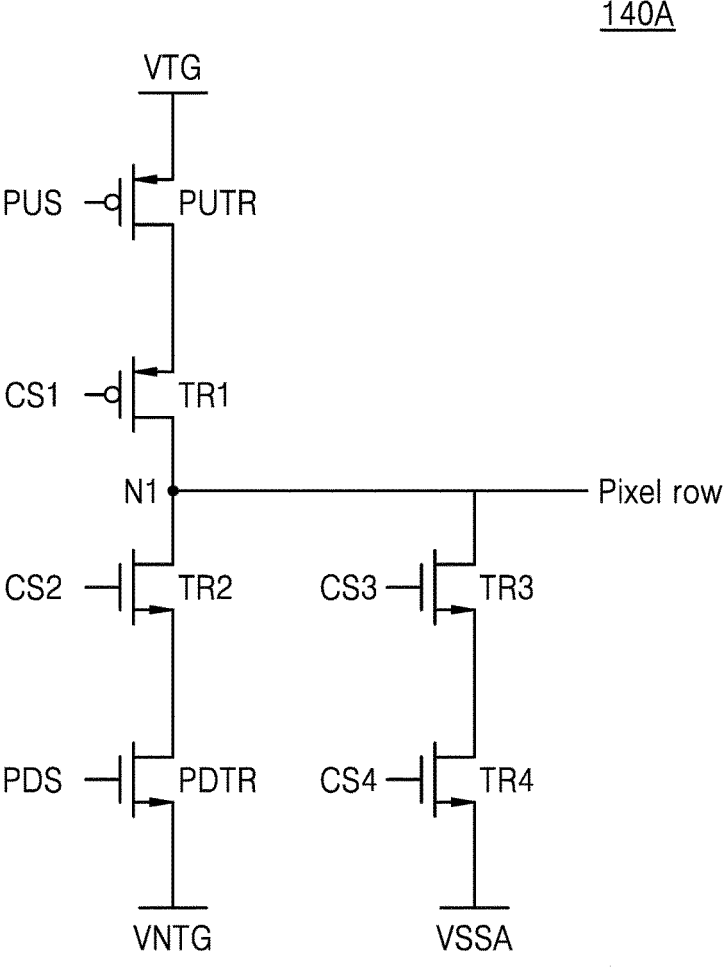
FIG. 4 is a circuit diagram of a row driver according to some embodiments.
Figure 5:
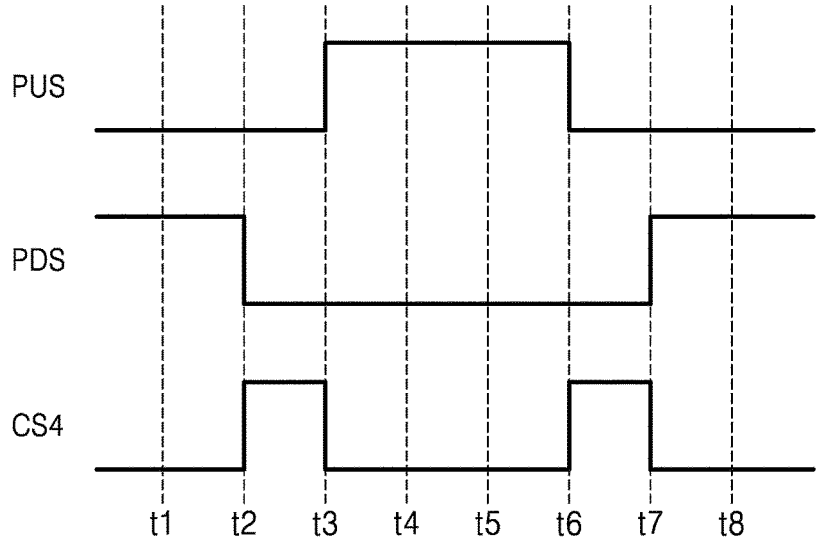
FIG. 5 is a timing diagram showing the operation of a row driver according to some embodiments.
Figure 6:
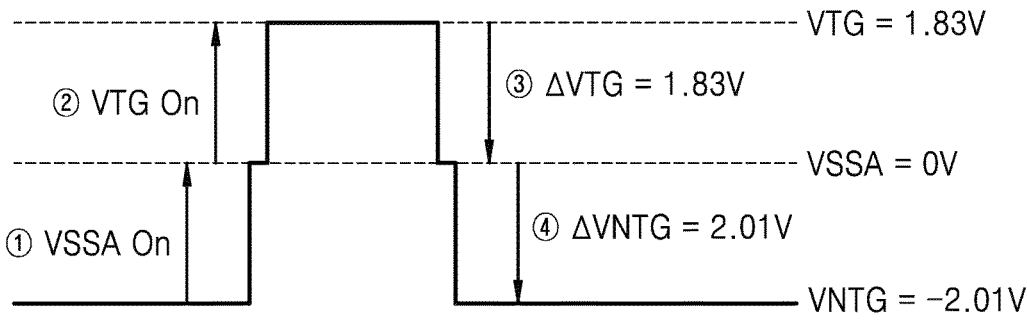
FIG. 6 is a graph showing the voltage of a row driver according to some embodiments.

FIG. 4 is a circuit diagram of a row driver 140A according to some embodiments. FIG. 5 is a timing diagram showing the operation of a row driver according to some embodiments. FIG. 6 is a graph showing the voltage of a row driver according to some embodiments.

Referring to FIG. 4, the row driver 140A may include a pull-up transistor PUTR, a first transistor TR1, a second transistor TR2, a third transistor TR3, a fourth transistor TR4, and a pull-down transistor PDTR. The row driver 140A of FIG. 4 may correspond to the row driver 140 of FIG. 1.

One end of the pull-up transistor PUTR may receive the first internal voltage VTG, and the other end of the pull-up transistor PUTR may be connected to the first transistor TR1. A gate of the pull-up transistor PUTR may be turned on or off in response to a pull-up signal PUS generated by the row driver 140A. The level of the pull-up signal PUS may be identical to the level of a pull-up voltage.

One end of the first transistor TR1 may be connected to the pull-up transistor PUTR, and the other end of the first transistor TR1 may be connected to the first node N1. A gate of the first transistor TR1 may be turned on or off in response to a first control signal CS1 generated by the row driver 140A. The level of the first control signal CS1 may be identical to the level of the first external voltage VSSA.

One end of the second transistor TR2 may be connected to the first node N1, and the other end of the second transistor TR2 may be connected to the pull-down transistor PDTR. A gate of the second transistor TR2 may be turned on or off in response to a second control signal CS2 generated by the row driver 140A. The level of the second control signal CS2 may be identical to the level of the second external voltage VDDB.

One end of the pull-down transistor PDTR may be connected to the second transistor TR2, and the other end of the pull-down transistor PDTR may receive the second internal voltage VNTG. A gate of the pull-down transistor PDTR may be turned on or off in response to a pull-down signal PDS generated by the row driver 140A. The level of the pull-down signal PDS may be identical to that of a pull-down voltage level.

One end of the third transistor TR3 may be connected to the first node N1, and the other end of the third transistor TR3 may be connected to the fourth transistor TR4. A gate of the third transistor TR3 may be turned on or off in response to a third control signal CS3 generated by the row driver 140A. The level of the third control signal CS3 may be identical to the level of the second external voltage VDDB.

One end of the fourth transistor TR4 may be connected to the third transistor TR3, and the other end of the fourth transistor TR4 may receive the first external voltage VSSA. A gate of the fourth transistor TR4 may be turned on or off in response to a fourth control signal CS4 received from the row driver 140A. The level of the fourth control signal CS4 may be identical to the level of the first external voltage VSSA.

The pull-up transistor PUTR and the first transistor TR1 may be PMOS transistors, and second to fourth transistors TR2 to TR4 and the pull-down transistor PDTR may be NMOS transistors. However, the present disclosure is not limited thereto.

A voltage that passes through the first node N1 may be provided to each row of the pixels PX included in the pixel array 110 of FIG. 1. For example, a voltage output from the first node N1 may be provided to the transfer transistor TX shown in FIG. 3. The level of a transmission control signal TG may be identical to the level of a voltage output from the first node N1.

Referring to FIGS. 4 and 5 together, the first transistor TR1, the second transistor TR2, and the third transistor TR3 may always be turned on. Hereinafter, descriptions will be given under the assumption that the first transistor TR1, the second transistor TR2, and the third transistor TR3 maintain the turn-on state.

At a first time point t1, the pull-down signal PDS may be at a first level (e.g., high level), and the pull-up signal PUS and the fourth control signal CS4 may be at a second level (e.g., low level). Since the pull-down signal PDS is at the first level, the pull-down transistor PDTR may be turned on. As the pull-down transistor PDTR is turned on, the second internal voltage VNTG may be applied the pull-down transistor PDTR. For example, referring to FIG. 6, the level of the second internal voltage VNTG may be −2.01 V.

At a second time point t2, the pull-down signal PDS may transition from the first level to the second level, and the pull-up signal PUS may maintain the second level. The fourth control signal CS4 may transition from the first level to the second level. The pull-down transistor PDTR may be turned off, and the fourth transistor TR4 may be turned on. As the fourth transistor TR4 is turned on, the first external voltage VSSA may be applied the fourth transistor TR4. For example, referring to FIG. 6, the level of the first external voltage VSSA may be 0 V. The amount of voltage change from the second time point t2 to a third time point t3 may be 2.01 V.

At the third time t3, the fourth control signal CS4 may transition from the second level to the first level, and the pull-down signal PDS may maintain the second level. The pull-up signal PUS may transition from the second level to the first level. The fourth transistor TR4 may be turned off, and the pull-up transistor PUTR may be turned on. As the pull-up transistor PUTR is turned on, the first internal voltage VTG may be applied the pull-up transistor PUTR. For example, referring to FIG. 6, the first internal voltage VTG may be 1.83 V. The amount of voltage change from the third time point t3 to a fourth time point t4 may be 1.83 V.

From the fourth time point t4 to a sixth time point t6, the pull-up signal PUS may maintain the first level, and the pull-down signal PDS and the fourth control signal CS4 may maintain the second level. For example, referring to FIG. 6, the voltage of the row driver 140A may be maintained at 1.83 V from the fourth time point t4 to the sixth time point t6.

At the sixth time point t6, the pull-down signal PDS may maintain the second level, and the fourth control signal CS4 may transition from the second level to the first level. The pull-up signal PUS may transition from the first level to the second level. The pull-up transistor PUTR may be turned off, and the fourth transistor TR4 may be turned on. As the fourth transistor TR4 is turned on, the first external voltage VSSA may be applied the fourth transistor TR4. For example, referring to FIG. 6, the level of the first external voltage VSSA may be 0 V. The amount of voltage change from the sixth time point t6 to a seventh time point t7 may be 1.83 V (e.g., −1.83 V).

At the seventh time t7, the pull-up signal PUS may maintain the second level, and the pull-down signal PDS may transition from the second level to the first level. The fourth control signal CS4 may transition from the first level to the second level. The pull-down transistor PDTR may be turned on, and the fourth transistor TR4 may be turned off. As the pull-down transistor PDTR is turned on, the second internal voltage VNTG may be applied the pull-down transistor PDTR. For example, referring to FIG. 6, the level of the second internal voltage VNTG may be −2.01 V. The amount of voltage change from the seventh time point t7 to an eighth time point t8 may be 2.01 V (e.g., −2.01 V).

At the eighth time point t8, the pull-up signal PUS and the fourth control signal CS4 may maintain the second level, and the pull-down signal PDS may maintain the first level. For example, referring to FIG. 6, from the eighth time point t8, the row driver 140A may maintain the second internal voltage VNTG, and the second internal voltage VNTG may be −2.01 V.

Although FIG. 6 shows that the first internal voltage VTG is 1.83 V, the second internal voltage VNTG is −2.01 V, and the first external voltage VSSA is 0 V, it is only an example, and embodiments are not limited thereto.

The row driver 140A according to some embodiments may include the third transistor TR3 and the fourth transistor TR4 connected to the first node N1 and may use the first external voltage VSSA by controlling turn-on and turn-off of the fourth transistor TR4.

According to some embodiments, when the image sensor operates according to the global shutter method, the row driver 140A may use not only an internal voltage but also an external voltage generated outside the image sensor. In other words, even when the row driver 140A drives a plurality of pixels simultaneously, the row driver 140A may sequentially drive the second internal voltage VNTG, the first external voltage VSSA, and the first external voltage VSSA in the order stated. In other words, since the row driver 140A may use an external voltage, the driving load of the internal voltage may be reduced during a global shutter operation and the voltage settling time may be reduced.

Figure 7:
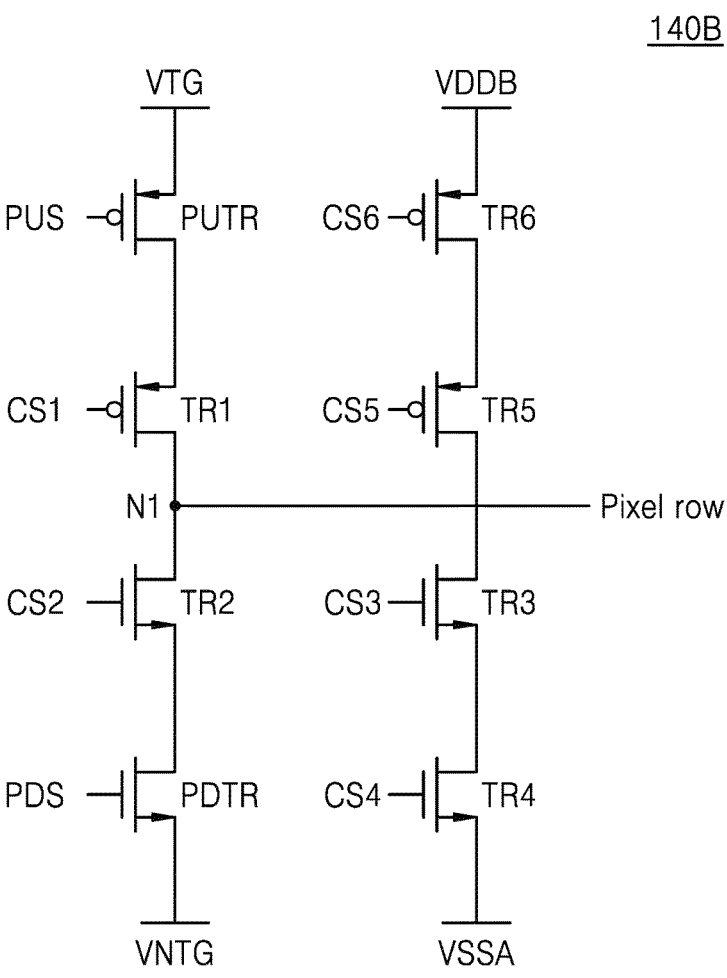
FIG. 7 is a circuit diagram of a row driver according to some embodiments.
Figure 8:
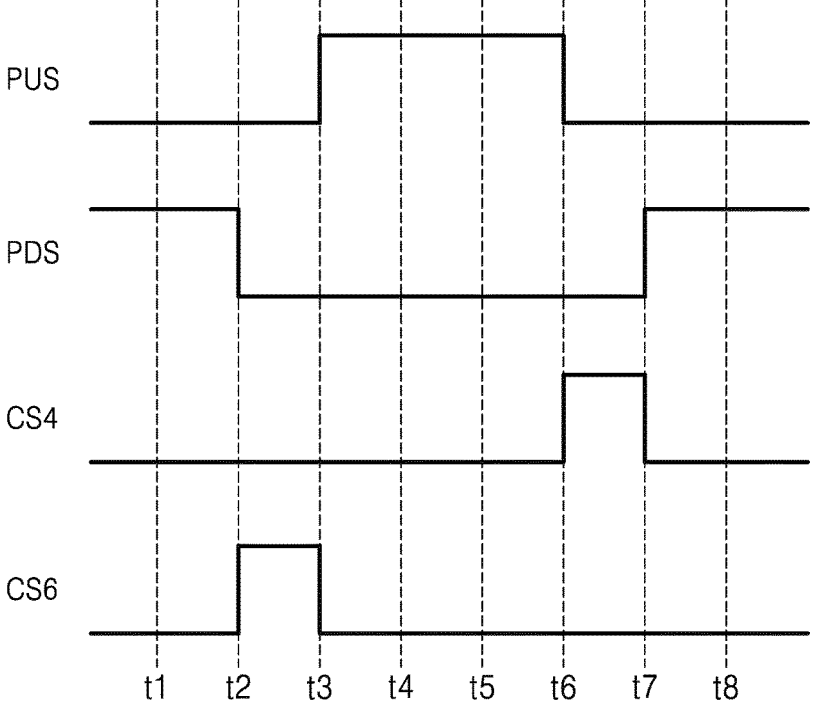
FIG. 8 is a timing diagram showing the operation of a row driver according to some embodiments.
Figure 9:
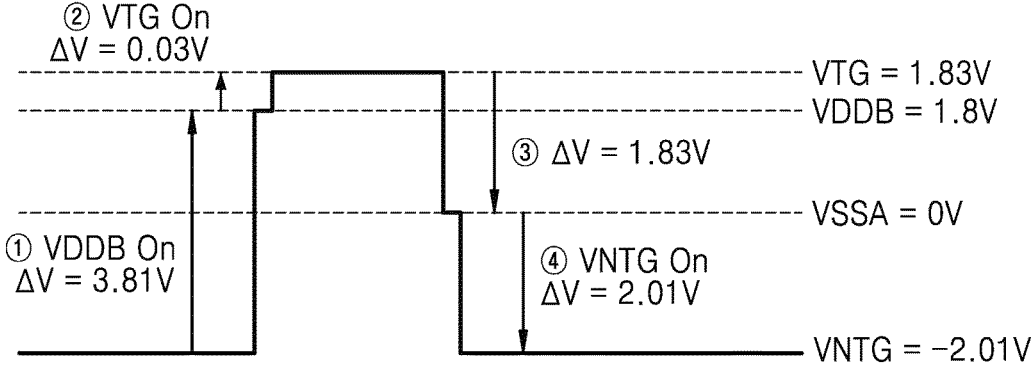
FIG. 9 is a graph showing the voltage of a row driver according to some embodiments.

FIG. 7 is a circuit diagram of a row driver 140B according to some embodiments. FIG. 8 is a timing diagram showing the operation of a row driver according to some embodiments. FIG. 9 is a graph showing the voltage of a row driver according to some embodiments.

Referring to FIG. 7, the row driver 140B may include the pull-up transistor PUTR, the first transistor TR1, the second transistor TR2, the third transistor TR3, the fourth transistor TR4, a fifth transistor TR5, a sixth transistor TR6, and the pull-down transistor PDTR. The row driver 140B of FIG. 7 may correspond to the row driver 140 of FIG. 1 or the row driver 140A of FIG. 4.

The row driver 140B of FIG. 7 may further include the fifth transistor TR5 and the sixth transistor TR6 as compared to the row driver 140A of FIG. 4. Descriptions identical to those given above with reference to FIG. 4 will be omitted here in the interest of brevity.

With respect to the row driver 140B of FIG. 7, one end of the fifth transistor TR5 may be connected to the first node N1, and the other end of the fifth transistor TR5 may be connected to the sixth transistor TR6. A gate of the fifth transistor TR5 may be turned on or off in response to a fifth control signal CS5 generated by the row driver 140B. The level of the fifth control signal CS5 may be identical to the level of the first external voltage VSSA.

One end of the sixth transistor TR6 may be connected to the fifth transistor TR5, and the other end of the sixth transistor TR6 may receive the second external voltage VDDB. A gate of the sixth transistor TR6 may be turned on or off in response to a sixth control signal CS6 generated by the row driver 140B. The level of the sixth control signal CS6 may be identical to the level of the first external voltage VSSA.

The fifth transistor TR5 and the sixth transistor TR6 may be PMOS transistors, but the present disclosure is not limited thereto.

Referring to FIGS. 7 and 8 together, the first transistor TR1, the second transistor TR2, the third transistor TR3, and the fifth transistor TR5 may always be turned on. Hereinafter, descriptions will be given under the assumption that the first transistor TR1, the second transistor TR2, the third transistor TR3, and the fifth transistor TR5 maintain the turn-on state.

At a first time point t1, the pull-down signal PDS may be at a first level (e.g., high level), and the pull-up signal PUS, the fourth control signal CS4, and the sixth control signal CS6 may be at a second level (e.g., low level). Since the pull-down signal PDS is at the first level, the pull-down transistor PDTR may be turned on. As the pull-down transistor PDTR is turned on, the second internal voltage VNTG may be applied the pull-down transistor PDTR. For example, referring to FIG. 9, the level of the second internal voltage VNTG may be −2.01 V.

At the second time point t2, the pull-up signal PUS and the fourth control signal CS4 may maintain the second level, the pull-down signal PDS may transition from the first level to the second level, and the sixth control signal CS6 may transition from the second level to the first level. The pull-down transistor PDTR may be turned off, and the sixth transistor TR6 may be turned on. When the sixth transistor TR6 is turned on, the second external voltage VDDB may be applied the sixth transistor TR6. For example, referring to FIG. 9, the level of the second external voltage VDDB may be 1.8 V. The amount of voltage change from the second time point t2 to the third time point t3 may be 3.81 V.

At the third time point t3, the pull-down signal PDS and the fourth control signal CS4 may maintain the second level, the pull-up signal PUS may transition from the second level to the first level, and the sixth control signal CS6 may transition from the first level to the second level. The pull-up transistor PUTR may be turned on, and the sixth transistor TR6 may be turned off. As the pull-up transistor PUTR is turned on, the first internal voltage VTG may be applied the pull-up transistor PUTR. For example, referring to FIG. 9, the first internal voltage VTG may be 1.83 V. The amount of voltage change from the third time point t3 to a fourth time point t4 may be 0.03 V.

From the fourth time point t4 to a sixth time point t6, the pull-up signal PUS may maintain the first level, and the pull-down signal PDS, the fourth control signal CS4, and the sixth control signal CS6 may maintain the second level. For example, referring to FIG. 9, the row driver 140 may maintain the first internal voltage VTG from the fourth time point t4 to the sixth time point t6. The first internal voltage VTG may be 1.83 V.

At the sixth time point t6, the pull-down signal PDS and the sixth control signal CS6 may maintain the second level, the pull-up signal PUS may transition from the first level to the second level, and the fourth control signal CS4 may transition from the second level to the first level. The pull-up transistor PUTR may be turned off, and the fourth transistor TR4 may be turned on. As the fourth transistor TR4 is turned on, the first external voltage VSSA may be applied the fourth transistor TR4. For example, referring to FIG. 9, the first external voltage VSSA may be 0 V, and the amount of voltage change from the sixth time point t6 to the seventh time point t7 may be 1.83 V (e.g., −1.83 V).

At the seventh time point t7, the pull-up signal PUS and the sixth control signal CS6 may maintain the second level, the pull-down signal PDS may transition from the second level to the first level, and the fourth control signal CS4 may transition from the first level to the second level. As the pull-down transistor PDTR is turned on, the second internal voltage VNTG may be applied the pull-down transistor PDTR. For example, referring to FIG. 9, the second internal voltage VNTG may be −2.01 V, and the amount of voltage change from the seventh time point t7 to the eighth time point t8 may be 2.01 V (e.g., −2.01 V).

At the eighth time point t8, the pull-up signal PUS, the fourth control signal CS4, and the sixth control signal CS6 may maintain the second level, and the pull-down signal PDS may maintain the first level. For example, referring to FIG. 9, from the eighth time point t8, the row driver 140B may maintain the second internal voltage VNTG and the second internal voltage VNTG may be −2.01 V.

Although FIG. 9 shows that the first internal voltage VTG is 1.83 V, the second internal voltage VNTG is −2.01 V, the first external voltage VSSA is 0 V, and the second external voltage VDDB is 1.8 V, this is only an example, and the present disclosure not limited thereto.

The row driver 140B according to some embodiments may include the third transistor TR3, the fourth transistor TR4, the fifth transistor TR5, and the sixth transistor TR6 connected to the first node N1. The row driver 140B may use the first external voltage VSSA and/or the second external voltage VDDB by adjusting turn-on and turn-off of the fourth transistor TR4 and/or the sixth transistor TR6.

Also, according to some embodiments, when the image sensor operates according to the global shutter method, the row driver 140B may use not only an internal voltage but also an external voltage generated outside the image sensor. In other words, even when the row driver 140B drives a plurality of pixels simultaneously, the row driver 140B may sequentially drive the second internal voltage VNTG, the first external voltage VSSA, the first external voltage VSSA, and the second external voltage VDDB in the order stated. In other words, since the row driver 140B may use an external voltage, the driving load of the internal voltage may be reduced during a global shutter operation and the voltage settling time may be reduced.

Figure 10:
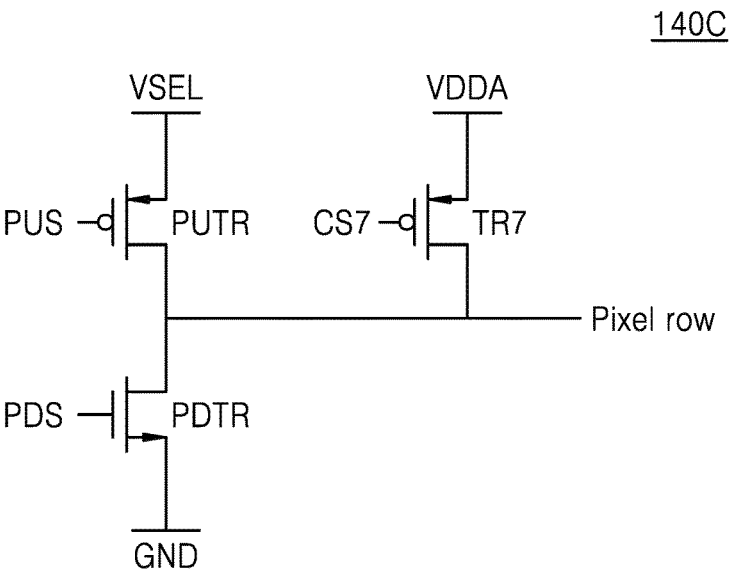
FIG. 10 is a circuit diagram of a row driver according to some embodiments.
Figure 11:
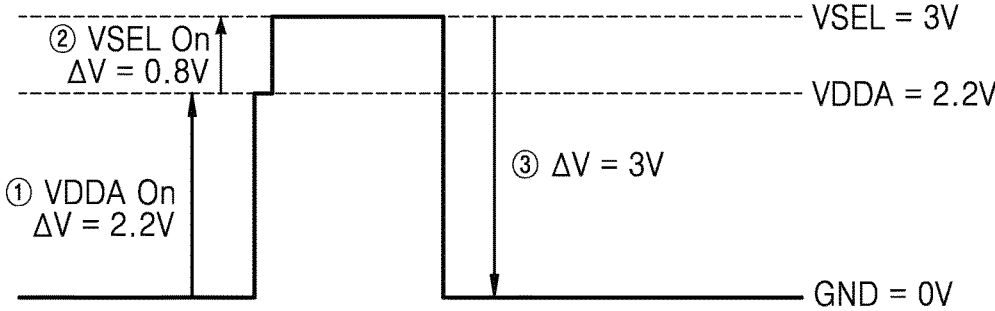
FIG. 11 is a graph showing the voltage of a row driver according to some embodiments.

FIG. 10 is a circuit diagram of a row driver 140C according to some embodiments. FIG. 11 is a graph showing the voltage of a row driver according to an embodiment.

Referring to FIG. 10, the row driver 140C may include the pull-up transistor PUTR, a seventh transistor TR7, and the pull-down transistor PDTR. The row driver 140C of FIG. 10 may correspond to the row driver 140 of FIG. 1.

One end of the pull-up transistor PUTR may receive the third internal voltage VSEL, and the other end of the pull-up transistor PUTR may be connected to the first node N1. A gate of the pull-up transistor PUTR may be turned on or off in response to the pull-up signal PUS generated by the row driver 140C. The level of the pull-up signal PUS may be identical to the level of a pull-up voltage.

One end of the pull-down transistor PDTR may be connected to the first node N1, and the other end of the pull-down transistor PDTR may be applied with a ground voltage GND. A gate of the pull-down transistor PDTR may be turned on or off in response to a pull-down signal PDS generated by the row driver 140C. The level of the pull-down signal PDS may be identical to that of a pull-down voltage level.

One end of the seventh transistor TR7 may receive the third external voltage VDDA, and the other end of the seventh transistor TR7 may be connected to the first node N1. A gate of the seventh transistor TR7 may be turned on or off in response to a seventh control signal CS7 generated by the row driver 140C. The level of the seventh control signal CS7 may be identical to the level of the third external voltage VDDA.

The pull-up transistor PUTR and the seventh transistor TR7 may be PMOS transistors, and the pull-down transistor PDTR may be an NMOS transistor. However, embodiments are not limited thereto.

A voltage that passes through the first node N1 may be provided to each rows of the pixels PX included in the pixel array 110 of FIG. 1. For example, a voltage output from the first node N1 may be provided to the transfer transistor TX or the selection transistor SX shown in FIG. 3. The level of the transmission control signal TG or the selection control signal SEL may be identical to the level of a voltage output from the first node N1.

Referring to FIGS. 10 and 11, when only the pull-down transistor PDTR is turned on and the pull-up transistor PUTR and the seventh transistor TR7 are turned off, the row driver 140C. may maintain the ground voltage GND. For example, the ground voltage GND may be 0 V.

When only the seventh transistor TR7 is turned on and the pull-up transistor PUTR and the pull-down transistor PDTR are turned off, the row driver 140C may receive a third external voltage VDDA. For example, the level of the third external voltage VDDA may be 2.2 V, and, at this time, the amount of voltage change may be 2.2 V.

When only the pull-up transistor PUTR is turned on and the pull-down transistor PDTR and the seventh transistor TR7 are turned off, the row driver 140C may receive the third internal voltage VSEL. For example, the level of the third internal voltage VSEL may be 3 V, and, at this time, the amount of voltage change may be 0.8 V.

When the pull-up transistor PUTR, the pull-down transistor PDTR, and the seventh transistor TR7 are turned off, the row driver 140C may receive the ground voltage GND. For example, the amount of voltage change at this time may be 3 V (e.g., −3 V).

The row driver 140C according to some embodiments of the inventive concept may include the seventh transistor TR7 connected to the first node N1. The row driver 140C may use the third external voltage VDDA by controlling turn-on and turn-off of the seventh transistor TR7.

Also, according to some embodiments, when the image sensor operates according to the global shutter method, the row driver 140C may use not only an internal voltage but also an external voltage generated outside the image sensor. In other words, even when the row driver 140C drives a plurality of pixels simultaneously, the row driver 140C may sequentially drive the second internal voltage VNTG, the first external voltage VSSA, the first external voltage VSSA, and the second external voltage VDDB in the order stated. In other words, since the row driver 140C may use an external voltage, the driving load of the internal voltage may be reduced during a global shutter operation and the voltage settling time may be reduced.

Figure 12:
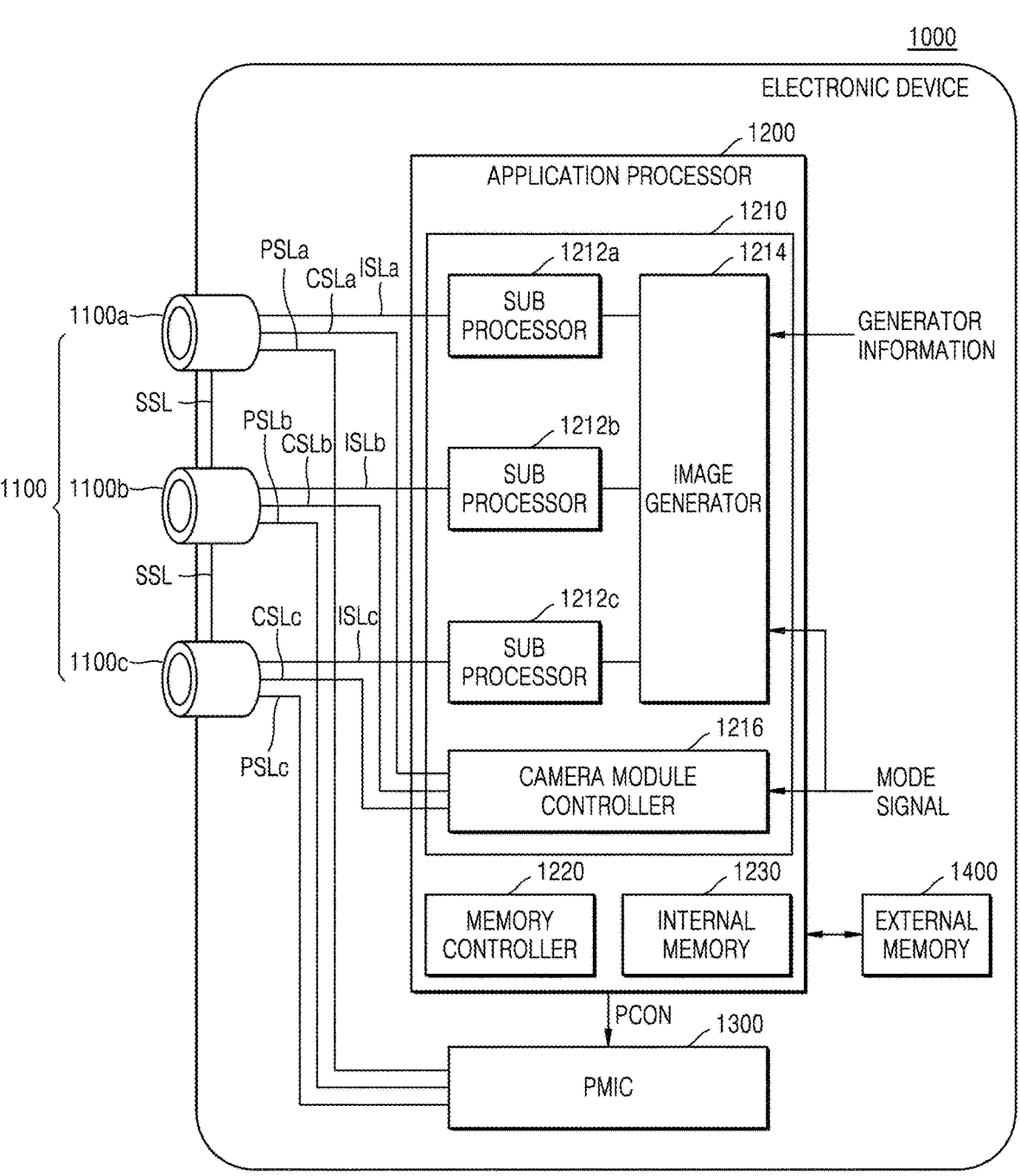
FIG. 12 is a block diagram showing an electronic device including a camera module.
Figure 13:
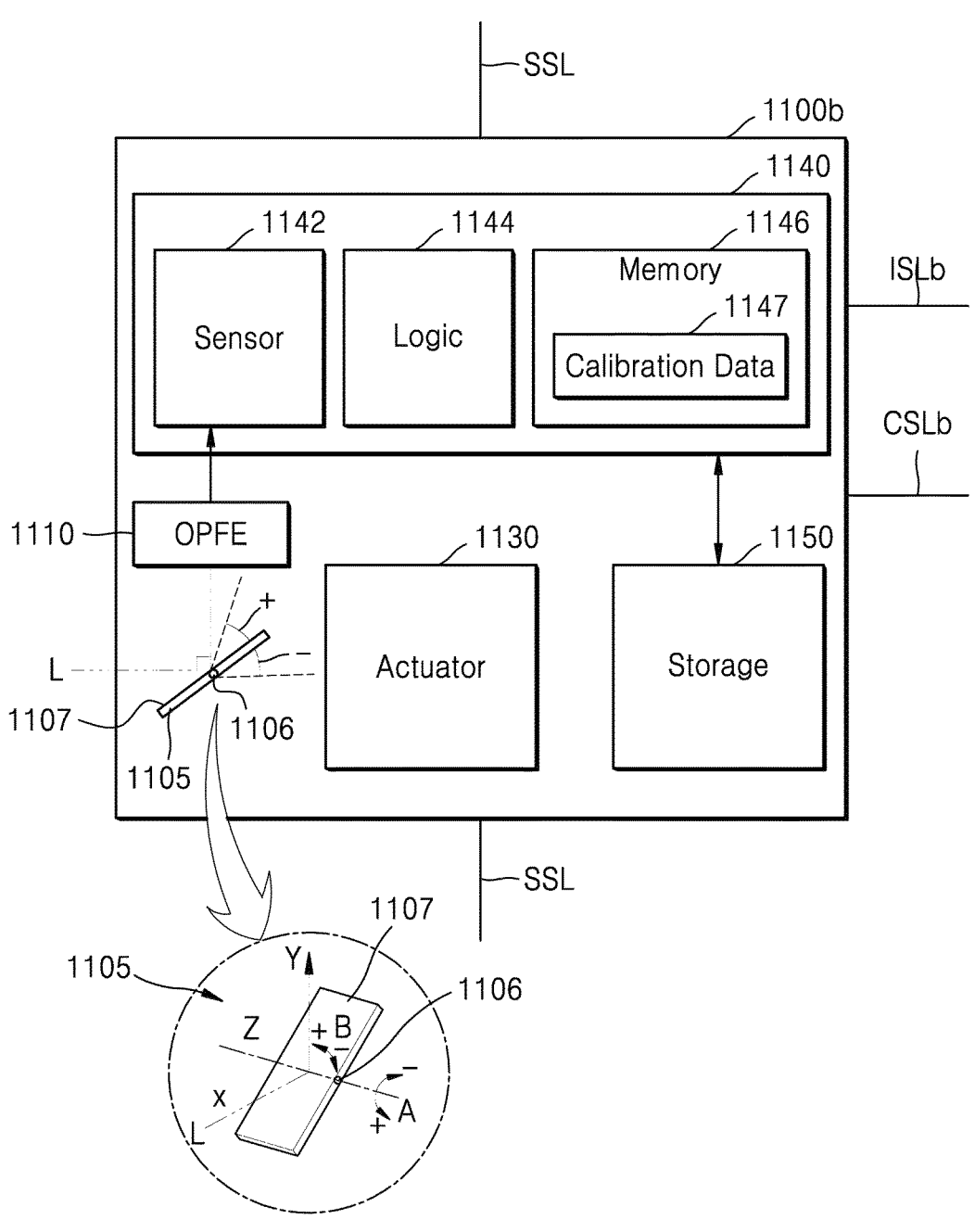
FIG. 13 is a detailed block diagram of the camera module of FIG. 12.

FIG. 12 is a block diagram showing an electronic device 1000 including a camera module. FIG. 13 is a detailed block diagram of a camera module 1100b of FIG. 12. Here, the detailed configuration of the camera module 1100b will be described below with reference to FIG. 13, but the following description may also be applied to the other camera modules 1100a and 1100c according to some embodiments.

Referring to FIG. 12, the electronic device 1000 may include a camera module group 1100, an application processor 1200, a PMIC 1300, and an external memory 1400. The camera module group 1100 may include a plurality of camera modules 1100a, 1100b, and 1100c. Although the drawing shows an embodiment in which three camera modules 1100a, 1100b, and 1100c are arranged, the present disclosure is not limited thereto.

Referring to FIGS. 12 and 13, the camera module 1100b may include a prism 1105, an optical path folding element (OPFE) 1110, an actuator 1130, an image sensing device 1140, and a storage 1150.

The prism 1105 may include a reflective surface 1107 of a light reflecting material to modify the path of light L incident from the outside. For example, the OPFE 1110 may include optical lenses including m (where m is a natural number) groups. The actuator 1130 may move the OPFE 1110 or optical lenses (hereinafter referred to as an optical lens) to a particular position.

The image sensing device 1140 may include an image sensor 1142, a control logic 1144, and a memory 1146. The image sensor 1142 may sense an image of a sensing target by using the light L provided through the optical lens. The image sensor 1142 may be an image sensor including at least one of pixels PX described above with reference to FIGS. 1 to 11.

According to some embodiments, the image sensor 1142 may include a row driver. When operating according to the global shutter method, the row driver may use not only an internal voltage but also an external voltage generated outside the image sensor (e.g., an external voltage generated by the PMIC 1300). In other words, the row driver may drive voltages sequentially even when a plurality of pixels are driven simultaneously. In other words, since the row driver may use an external voltage, the row driver may drive voltages sequentially in multi-state during a global shutter operation, and thus the driving load of an internal voltage may be reduced, and the voltage settling time may be reduced.

The control logic 1144 may control the overall operation of the camera module 1100b. For example, the control logic 1144 may control the operation of the camera module 1100b according to a control signal provided through a control signal line CSLb.

According to some embodiments, one camera module (e.g., the camera module 1100b) from among the camera modules 1100a, 1100b, and 1100c may be a folded lens-type camera module including the prism 1105 and the OPFE 1110 as described above, and the other camera modules (e.g., 1100a and 1100c) may be a vertical-type camera module without the prism 1105 and the OPFE 1110. However, the present disclosure is not limited thereto.

According to some embodiments, one camera module (e.g., the camera module 1100c) from among the camera modules 1100a, 1100b, and 1100c may be a vertical-type depth camera that extracts depth information by using an infrared ray (IR), for example. In this case, the application processor 1200 may merge image data provided from such a depth camera with image data provided from another camera module (e.g., the camera module 1100a or 1100b) and generate a 3D depth image. However, the present disclosure is not limited thereto.

According to some embodiments, at least two camera modules (e.g., the camera module 1100a and the camera module 1100b) from among the camera modules 1100a, 1100b, and 1100c may have different field of views (FOVs). In this case, for example, at least two camera modules (e.g., the camera module 1100a and the camera module 1100b) from among the camera modules 1100a, 1100b, and 1100c may have different optical lenses, but the present disclosure is not limited thereto.

Furthermore, according to some embodiments, the camera modules 1100a, 1100b, and 1100c may have different FOVs from one another. In this case, optical lenses included in the camera modules 1100a, 1100b, and 1100c may also be different from one another, but the present disclosure is not limited thereto.

According to some embodiments, the camera modules 1100a, 1100b, and 1100c may be physically separated from one another. In other words, the camera modules 1100a, 1100b, and 1100c may not divide and use the sensing area of one image sensor 1142. Rather, an independent image sensor 1142 may be provided inside each of the camera modules 1100a, 1100b, and 1100c. However, the present disclosure is not limited thereto.

Referring back to FIG. 12, the application processor 1200 may include an image processing device 1210, a memory controller 1220, and an internal memory 1230. The application processor 1200 may be implemented separately from the camera modules 1100a, 1100b, and 1100c. For example, the application processor 1200 and the camera modules 1100a, 1100b, and 1100c may be implemented separately from each other as separate semiconductor chips.

The image processing device 1210 may include a plurality of sub image processors 1212a, 1212b, and 1212c, an image generator 1214, and a camera module controller 1216.

The number of sub image processors (e.g., the sub image processors 1212a, 1212b, and 1212c) included in the image processing device 1210 may correspond to the number of camera modules (e.g., the camera modules 1100a, 1100b, and 1100c).

Image data generated by the camera modules 1100a, 1100b, and 1100c may be respectively provided to sub processors 1212a, 1212b, and 1212c respectively corresponding to the camera modules 1100a, 1100b, and 1100c through image signal lines ISLa, ISLb, and ISLc separated from one another. For example, image data generated by the camera module 1100a may be provided to the sub image processor 1212a through the image signal line ISLa, image data generated by the camera module 1100b may be provided to the sub image processor 1212b through the image signal line ISLb, and image data generated by the camera module 1100c may be provided to the sub image processor 1212c through the image signal line ISLc. The transmission of image data may be performed by using a camera serial interface (CSI) based on the mobile industry processor interface (MIPI), but the present disclosure is not limited thereto.

Image data provided to each of the sub image processors 1212a, 1212b, and 1212c may be provided to the image generator 1214. The image generator 1214 may generate an output image by using image data provided from each of the sub image processors 1212a, 1212b, and 1212c according to image generating information or a mode signal.

In greater detail, the image generator 1214 may generate an output image by merging at least parts of image data generated by the camera modules 1100a, 1100b, and 1100c having different FOVs according to image generating information or a mode signal. Also, the image generator 1214 may generate an output image by selecting any one of image data generated by the camera modules 1100a, 1100b, and 1100c having different FOVs according to image generating information or a mode signal.

The camera module controller 1216 may provide a control signal to each of the camera modules 1100a, 1100b, and 1100c. A control signal generated from the camera module controller 1216 may be provided to corresponding camera modules 1100a, 1100b, and 1100c through control signal lines CSLa, CSLb, and CSLc separated from one another.

The application processor 1200 may store a received image data, that is, the encoded image signal, in the internal memory 1230 provided therein or the storage 1400 outside the application processor 1200, and, thereafter, the application processor 1200 may read the encoded data from the internal memory 1230 or the storage 1400, decode the encoded image data, and display image data generated based on a decoded image signal. For example, a corresponding sub processor from among the sub processors 1212a, 1212b, and 1212c of the image processing device 1210 may perform decoding and may also perform image processing on decoded image data.

The PMIC 1300 may supply power, e.g., a power voltage, to each of the camera modules 1100a, 1100b, and 1100c. For example, under control by the application processor 1200, the PMIC 1300 may supply first power to the camera module 1100a through a power signal line PSLa, supply second power to the camera module 1100b through a power signal line PSLb, and supply third power to the camera module 1100c through a power signal line PSLc.

While the inventive concepts of the present disclosure have been particularly shown and described with reference to some examples of embodiments thereof, it will be understood that various changes in form and details may be made therein without departing from the scope of the following claims.

What is claimed is:

1. An image sensor comprising:
a pixel array in which a plurality of pixels are arranged;

a row driver configured to generate control signals for controlling the plurality of pixels, the row driver configured to use an external voltage received from a source outside the image sensor and an internal voltage generated within the image sensor; and a voltage generator configured to generate the internal voltage, wherein the external voltage comprises a first external voltage and a second external voltage and the internal voltage comprises a first internal voltage and a second internal voltage, wherein a level of the first internal voltage is higher than a level of the second internal voltage, and wherein a level of the first external voltage is between the level of the first internal voltage and the level of the second internal voltage, and wherein the row driver comprises:

a pull-up transistor configured to receive the first internal voltage;

a first transistor connected to one end of the pull-up transistor and connected to a first node;

a second transistor connected to the first node;

a pull-down transistor configured to receive the second internal voltage and connected to one end of the second transistor;

a third transistor connected to the first node; and a fourth transistor configured to receive the first external voltage and connected to one end of the third transistor.

2. The image sensor of claim 1, wherein, when the plurality of pixels operate in a global shutter mode, the row driver is configured to control the pull-down transistor to be turned on and the pull-up transistor and the fourth transistor to be turned off in a first period, causing the second internal voltage to be output from the first node.

3. The image sensor of claim 2, wherein, in a second period subsequent to the first period, the row driver is configured to control the pull-up transistor and the pull-down transistor to be turned off and the fourth transistor to be turned on, causing the first external voltage to be output from the first node.

4. The image sensor of claim 3, wherein, in a third period subsequent to the second period, the row driver is configured to control the pull-down transistor and the fourth transistor to be turned off and the pull-up transistor to be turned on, causing the first internal voltage to be output from the first node.

5. The image sensor of claim 1, wherein a voltage output from the first node is provided to a transfer transistor included in the plurality of pixels.

6. The image sensor of claim 5, wherein the row driver is configured to control the plurality of pixels by sequentially increasing voltages output from the first node in an order of the second internal voltage, the first external voltage, and the first internal voltage.

7. The image sensor of claim 1, wherein the row driver comprises:

a fifth transistor connected to the first node; and a sixth transistor connected to one end of the fifth transistor and configured to receive the second internal voltage.

8. The image sensor of claim 7, wherein, when the plurality of pixels operate in a global shutter mode, the row driver is configured to control the pull-down transistor to be turned on and the pull-up transistor, the fourth transistor, and the sixth transistor to be turned off in a first period, causing the second internal voltage to be output from the first node.

9. The image sensor of claim 8, wherein, in a second period subsequent to the first period, the row driver is configured to control the pull-up transistor, the pull-down transistor, and the fourth transistor to be turned off and the sixth transistor to be turned on, causing the second external voltage to be output from the first node.

10. The image sensor of claim 9, wherein, in a third period subsequent to the second period, the row driver is configured to control the pull-down transistor, the fourth transistor, and the sixth transistor to be turned off and the pull-up transistor to be turned on, causing the first internal voltage to be output from the first node.

11. The image sensor of claim 10, wherein, in a fourth period subsequent to the third period, the row driver is configured to control the pull-up transistor, the pull-down transistor, and the sixth transistor to be turned off and the fourth transistor to be turned on, causing the first external voltage to be output from the first node.

12. The image sensor of claim 7, wherein the row driver is configured to control the plurality of pixels by sequentially increasing voltages output from the first node in an order of the second internal voltage, the second external voltage, the first external voltage, and the first internal voltage.

13. An image processing system comprising:

a first chip comprising an external voltage generator configured to generate an external voltage and a first pad configured to output the external voltage;

a second pad configured to receive the external voltage;

a pixel array in which a plurality of pixels are arranged;

a second chip comprising a voltage generator configured to generate an internal voltage; and a row driver configured to generate control signals that control the plurality of pixels, the row driver configured to use the external voltage and the internal voltage, wherein the external voltage comprises a first external voltage and a second external voltage, the internal voltage comprises a first internal voltage and a second internal voltage, a level of the first internal voltage is higher than a level of the second internal voltage, and a level of the first external voltage is between the level of the first internal voltage and the level of the second internal voltage, and wherein the row driver comprises:

a pull-up transistor configured to receive the first internal voltage;

a first transistor connected to one end of the pull-up transistor and connected to a first node;

a second transistor connected to the first node; and a pull-down transistor configured to receive the second internal voltage and connected to one end of the second transistor;

a third transistor connected to the first node; and a fourth transistor configured to receive the first external voltage and connected to one end of the third transistor.

14. The image processing system of claim 13, wherein the row driver comprises:

a fifth transistor connected to the first node; and a sixth transistor connected to one end of the fifth transistor and configured to receive the second external voltage.

15. The image processing system of claim 14, wherein, in a first period, the row driver is configured to control the pull-up transistor, the pull-down transistor, and the fourth transistor to be turned off and the sixth transistor to be turned on, causing the second external voltage to be output from the first node.

16. The image processing system of claim 15, wherein, in a second period subsequent to the first period, the row driver is configured to control the pull-up transistor, the pull-down transistor, and the sixth transistor to be turned off and the fourth transistor to be turned on, causing the first external voltage to be output from the first node.

17. A row driver comprising:

a first transistor that is configured to receive a first internal voltage and is connected to a first node;

a second transistor that is connected to the first node and is configured to receive a second internal voltage; and a third transistor that is connected to the first node and is configured to receive an external voltage generated by a source that is different from a source of the first internal voltage and the second internal voltage, wherein a level of the first internal voltage is higher than a level of the second internal voltage, and a level of the external voltage is between the level of the first internal voltage and the level of the second internal voltage.

18. The row driver of claim 17, wherein the row driver is configured to control a plurality of pixels by sequentially increasing voltages output from the first node in an order of the second internal voltage, the external voltage, and the first internal voltage.

19. The row driver of claim 18, wherein, when the plurality of pixels operate in a global shutter mode, the row driver is configured to control a pull-up transistor and the first transistor to be turned off in a first period, and control a pull-down transistor to be turned on in the first period, causing the second internal voltage to be output from the first node.

20. The row driver of claim 19, wherein, in a second period subsequent to the first period, the row driver is configured to control the pull-up transistor and the pull-down transistor to be turned off and the first transistor to be turned on, causing the external voltage to be output from the first node.

* * * * *